(12) United States Patent  
Herbert

(10) Patent No.: US 8,535,187 B2
(45) Date of Patent: Sep. 17, 2013

(54) MOTORCYCLE CAMSHAFT DRIVE TENSIONER

(75) Inventor: Adam Herbert, Baltimore, MD (US)

(73) Assignee: Zipper's Cycle, Inc., Elkridge, MD (US)

( * ) Notice: Subject to any disclaimer, the term of this patent is extended or adjusted under 35 U.S.C. 154(b) by 270 days.

(21) Appl. No.: 13/017,821

(22) Filed: Jan. 31, 2011

(65) Prior Publication Data

US 2012/0192821 A1  Aug. 2, 2012

(51) Int. Cl.
*F16H 7/08* (2006.01)

(52) U.S. Cl.
USPC .......................................... 474/110; 474/111

(58) Field of Classification Search
USPC ................. 474/101, 103, 104, 109, 110, 111, 474/140, 273; 180/231, 351; 198/813
See application file for complete search history.

(56) References Cited

U.S. PATENT DOCUMENTS

| 5,989,138 | A | * | 11/1999 | Capucci | 474/109 |
| 6,047,667 | A |   | 4/2000  | Leppanen et al. | |
| 6,112,712 | A |   | 9/2000  | Safarik et al. | |
| 2007/0032322 | A1 | * | 2/2007 | Beardmore | 474/110 |

OTHER PUBLICATIONS

Harley-Davidson Motor Company. Touring Models. 2011 Harley-Davidson Service Manual. copyright 2010. U.S.A. (two cover sheets and single p. "Engine 3-79").

* cited by examiner

*Primary Examiner* — Sang Kim
*Assistant Examiner* — Juan Campos, Jr.
(74) *Attorney, Agent, or Firm* — Leo J. Jennings; Loza & Loza, LLP

(57) ABSTRACT

A cam drive tensioner for use with an engine includes a main body mounted to a component of the engine; a shoe movably mounted to the main body, for movement in a first direction; and two or more hydraulic chambers defined between the main body and the shoe, with the two or more hydraulic chambers being laterally spaced apart from each other in a second direction generally perpendicular to the first direction.

12 Claims, 17 Drawing Sheets

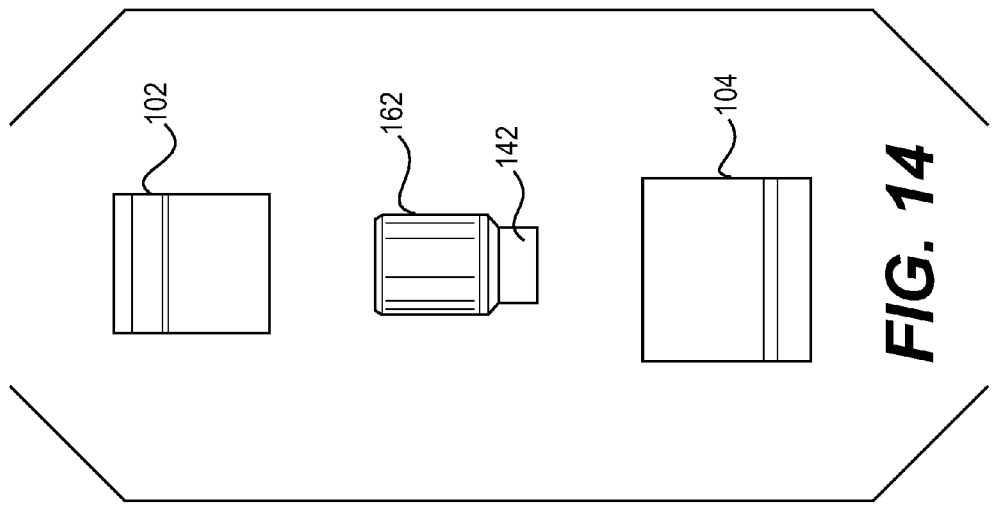
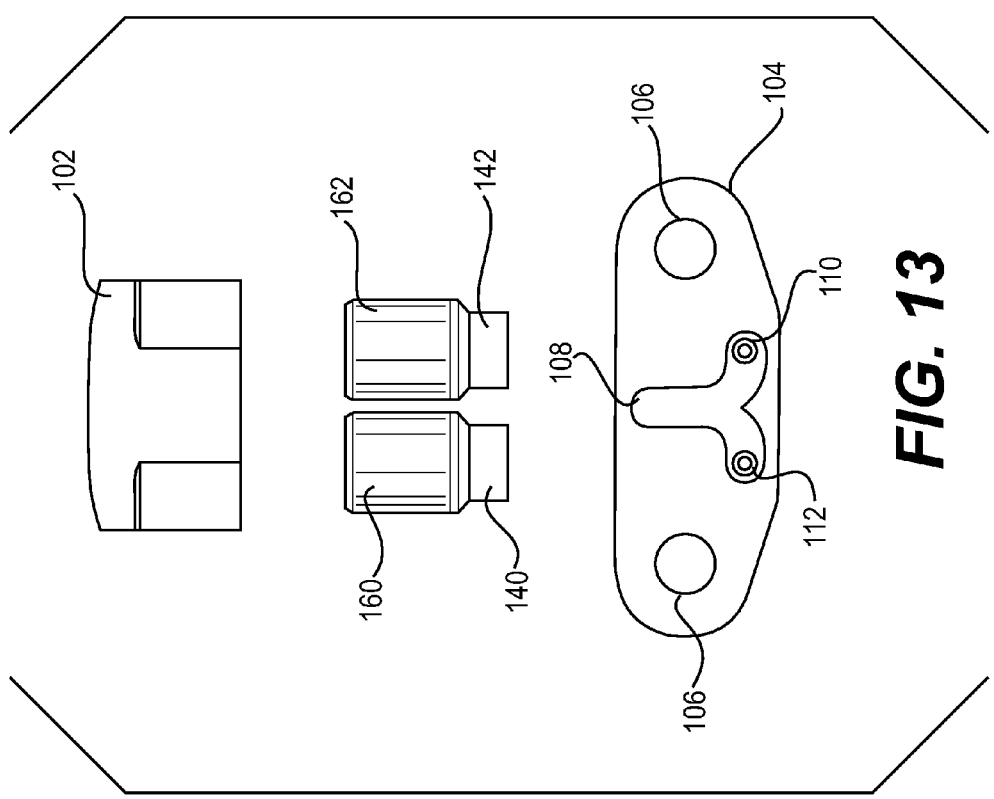

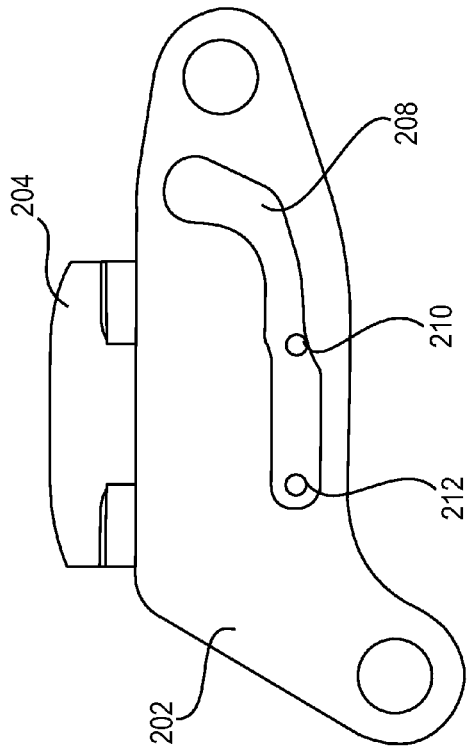
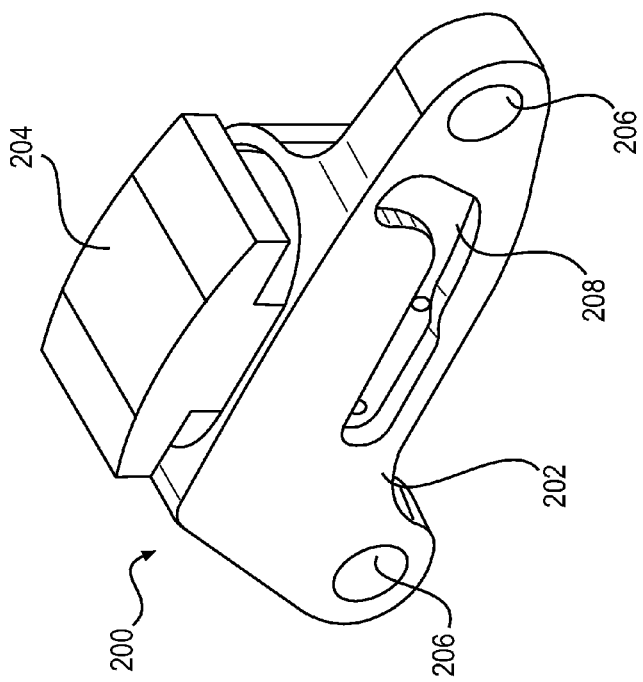

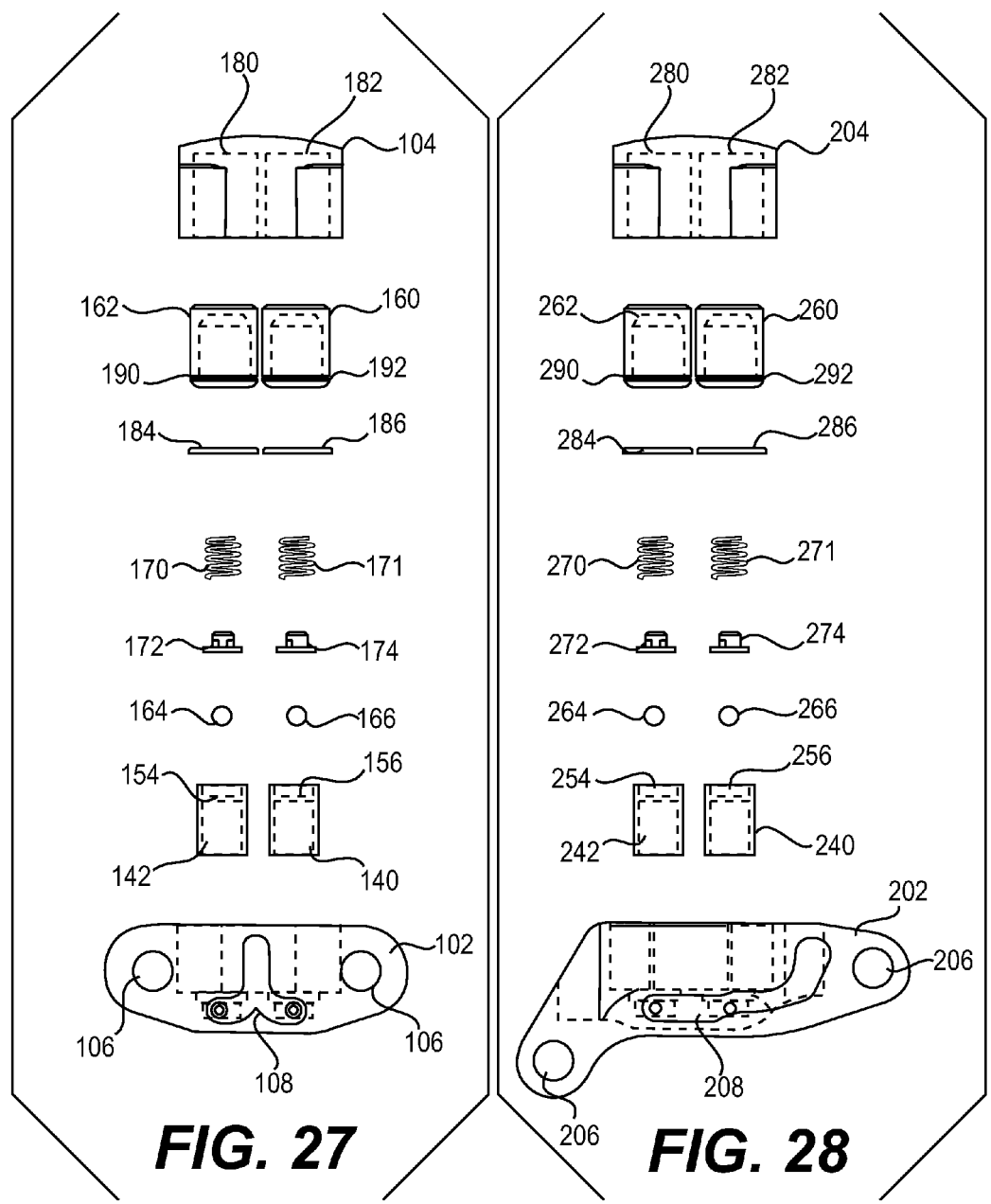

MOTORCYCLE CAMSHAFT DRIVE TENSIONER

TECHNICAL FIELD

Some embodiments relate to internal combustion engines for motorcycles, and more particularly, to the tensioning of a chain camshaft drive.

BACKGROUND

Motorcycle engines are well known that may include chain-driven camshafts. There may be more than one chain involved, with one chain driving one of the camshafts, and another chain driving a second camshaft off of the first camshaft.

The chain drives the various camshafts by being wrapped around sprockets on ends of the shafts. There is typically some degree of slack present in the chain if no additional tensioner is present. Any slack is undesirable because it can cause a deviation from correct cam timing, as well as producing noise from less of control of the valve or valve spring, or slapping of the chain. Therefore, it is desirable to provide a steady, even tension on the chain so that slack between the sprockets is reduced or eliminated to a desirable degree.

SUMMARY

In light of the present need for motorcycle camshaft shaft drive tensioner, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In an aspect of some examples, there is provided a cam drive tensioner for use with an engine, with the tensioner having a main body mounted to a component of the engine; a shoe movably mounted to the main body, for movement in a first direction; and two or more hydraulic chambers defined between the main body and the shoe, with the two or more hydraulic chambers being laterally spaced apart from each other in a second direction generally perpendicular to the first direction.

In an aspect of other examples, there is provided a cam drive tensioner for use with an engine having a cam drive chain, the tensioner comprising: a main body having a main fluid inlet port and a floor having a first piston mounting surface and a second piston mounting surface, with the first piston mounting surface having a first port in fluid communication with the main fluid inlet port, and the second piston mounting surface having a second port in fluid communication with the main fluid inlet port; a first piston having a first top end and a first open bottom end that forms a first fluid chamber in combination with the first piston mounting surface; a second piston having a first top end and an second open bottom end that forms a second fluid chamber in combination with the second piston mounting surface; and a shoe movable with respect to the main body, with the first and second pistons each disposed in between the shoe and the main body so that fluid pressure applied to the mail fluid inlet port urges the shoe away from the main body.

In an aspect of some other examples, there is provided cam drive tensioner for use with an engine, comprising: a main body mounted to a component of the engine; a shoe movably mounted to the main body, for movement in a first direction; and means for biasing the shoe away from the main body, and for contacting the shoe at two or more contact locations on the shoe, with the two or more contact locations each being spaced apart from each other.

In an aspect of yet other examples, there is provided cam drive tensioner for use with an engine, comprising: a main body mounted to a component of the engine; a shoe movably mounted to the main body, for movement in a first direction, the shoe defining a first bore defined into the shoe and a second bore defined into the shoe; a first hydraulic component that is received in the first bore; and a second hydraulic component that is received in the second bore.

In still another aspect of other examples, there is provided a motorcycle engine, comprising: at least one camshaft; a camshaft support plate; and a cam drive tensioner, comprising: a main body mounted to the camshaft support plate; a shoe movably mounted to the main body, for movement in a first direction; and two or more hydraulic components mounted between the main body and the shoe, with the two or more hydraulic components being laterally spaced apart from each other in a second direction generally perpendicular to the first direction.

In a still other aspect of some examples, there is provided a shoe for use with a motorcycle cam drive chain tensioner, the shoe comprising: a shoe element having a first surface adapted to contact the cam drive chain and a second surface opposite the first surface, with two bores defined into the element on the second surface.

BRIEF DESCRIPTION OF THE DRAWINGS

In order to better understand various exemplary embodiments, reference is made to the accompanying drawings, wherein:

FIG. 13 is a front partially exploded view of the tensioner of FIG. 8.

FIG. 14 is an side partially exploded end view of the tensioner of FIG. 8.

FIG. 19 is a perspective view of a camshaft drive chain tensioner according to a second embodiment.

FIG. 20 is a front view of the tensioner of FIG. 19.

FIG. 27 is a front exploded view of the first embodiment.

FIG. 28 is a front exploded view of the second embodiment.

DETAILED DESCRIPTION

Figure 1:
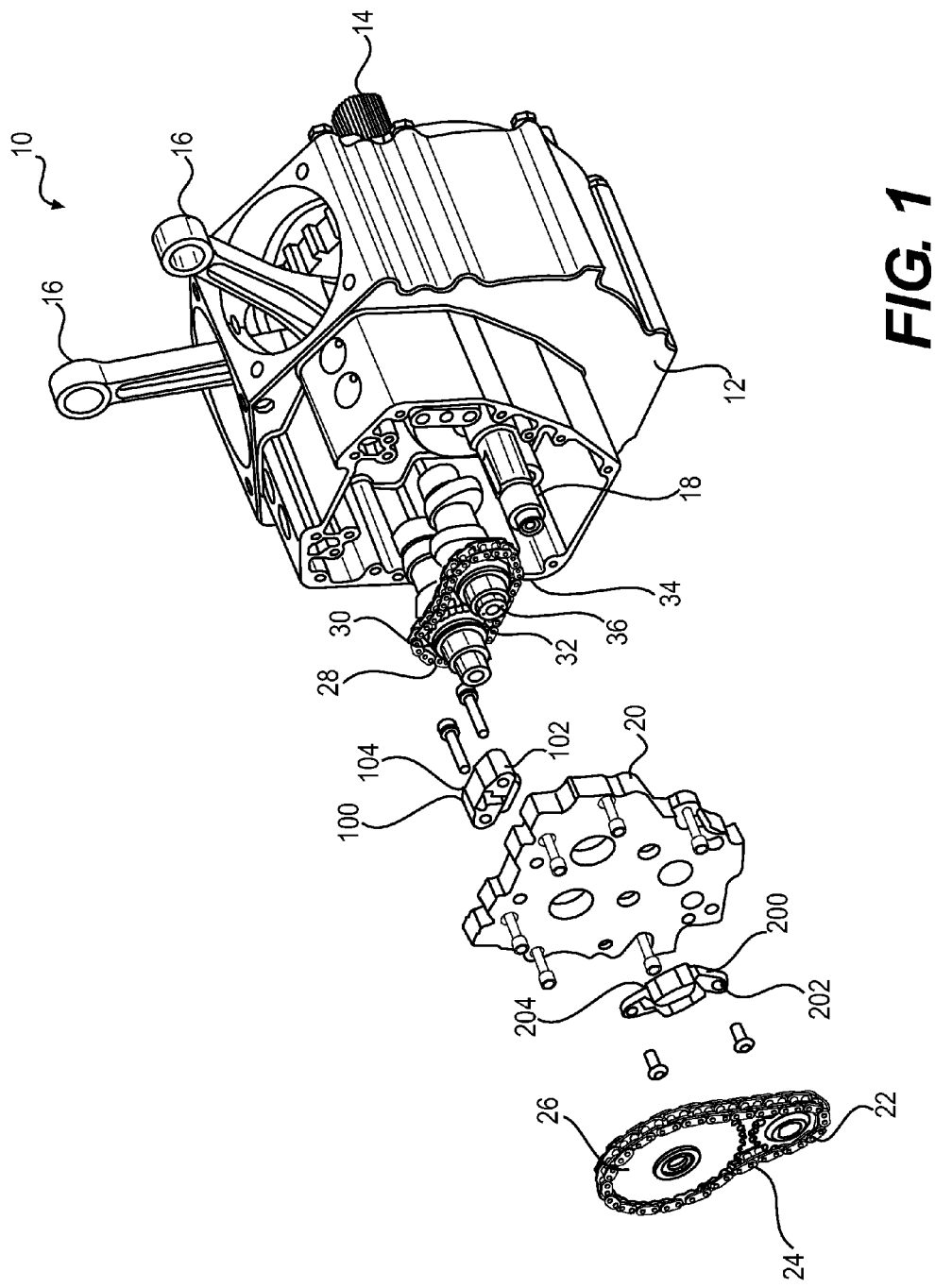
FIG. 1 is an exploded perspective view of the lower end of a motorcycle engine, showing two camshaft drive chain tensioners used with an engine having a crankcase and a camshaft support plate, showing the engine cover removed.
Figure 2:
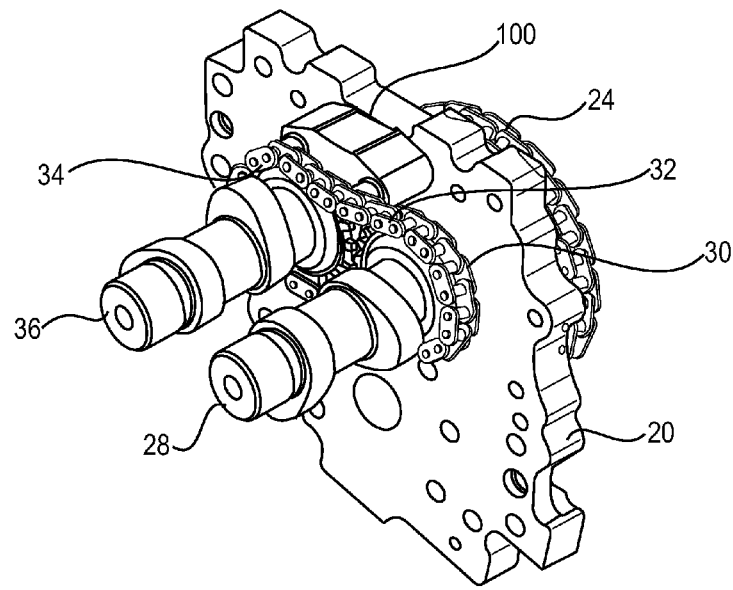
FIG. 2 is a rear perspective view of a camshaft support plate, with a camshaft drive chain tensioner, according to a first embodiment, mounted thereto.
Figure 3:
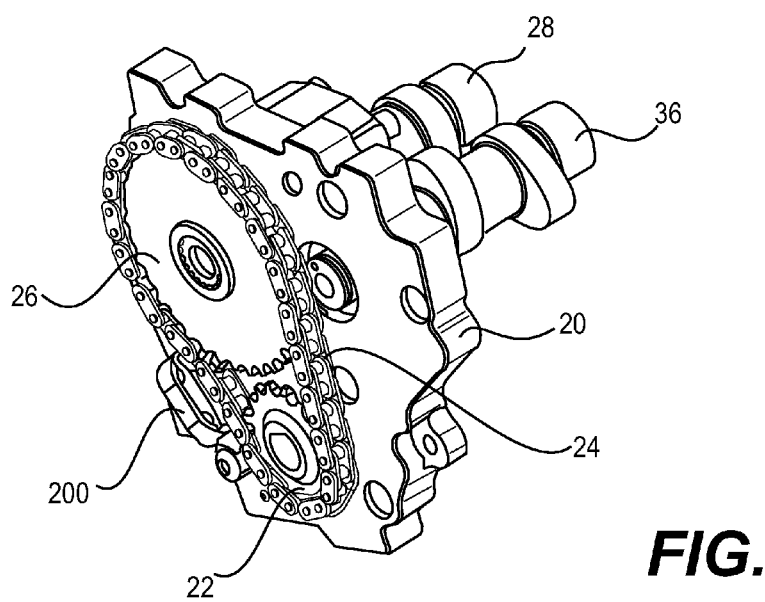
FIG. 3 is a front perspective rear view of a camshaft support plate, with a camshaft drive chain tensioner, according to a second embodiment, mounted thereto.
Figure 6:
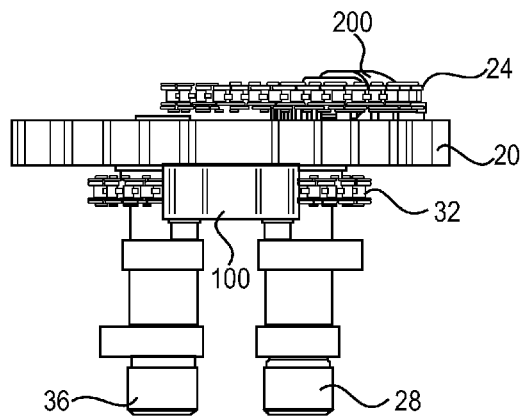
FIG. 6 is a top view of the arrangement shown in FIGS. 2 and 3.
Figure 4:
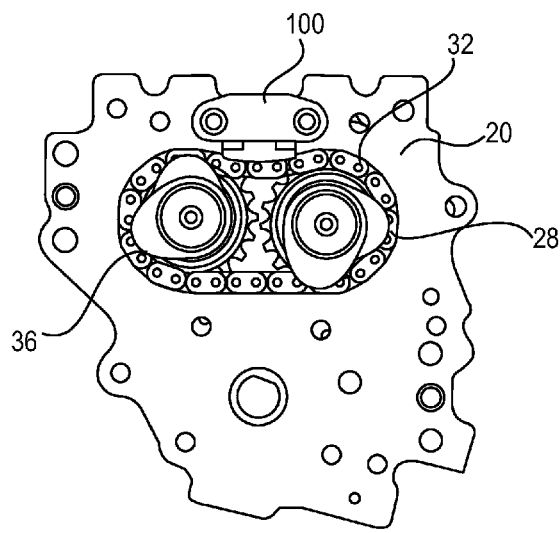
FIG. 4 is a rear view of the assembly of FIG. 2.
Figure 7:
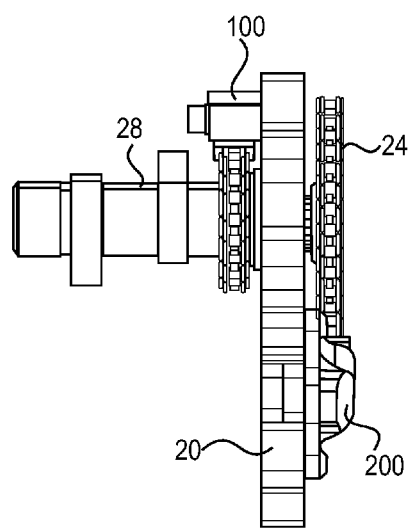
FIG. 7 is a side view of the assembly shown in FIGS. 2 and 3.
Figure 5:
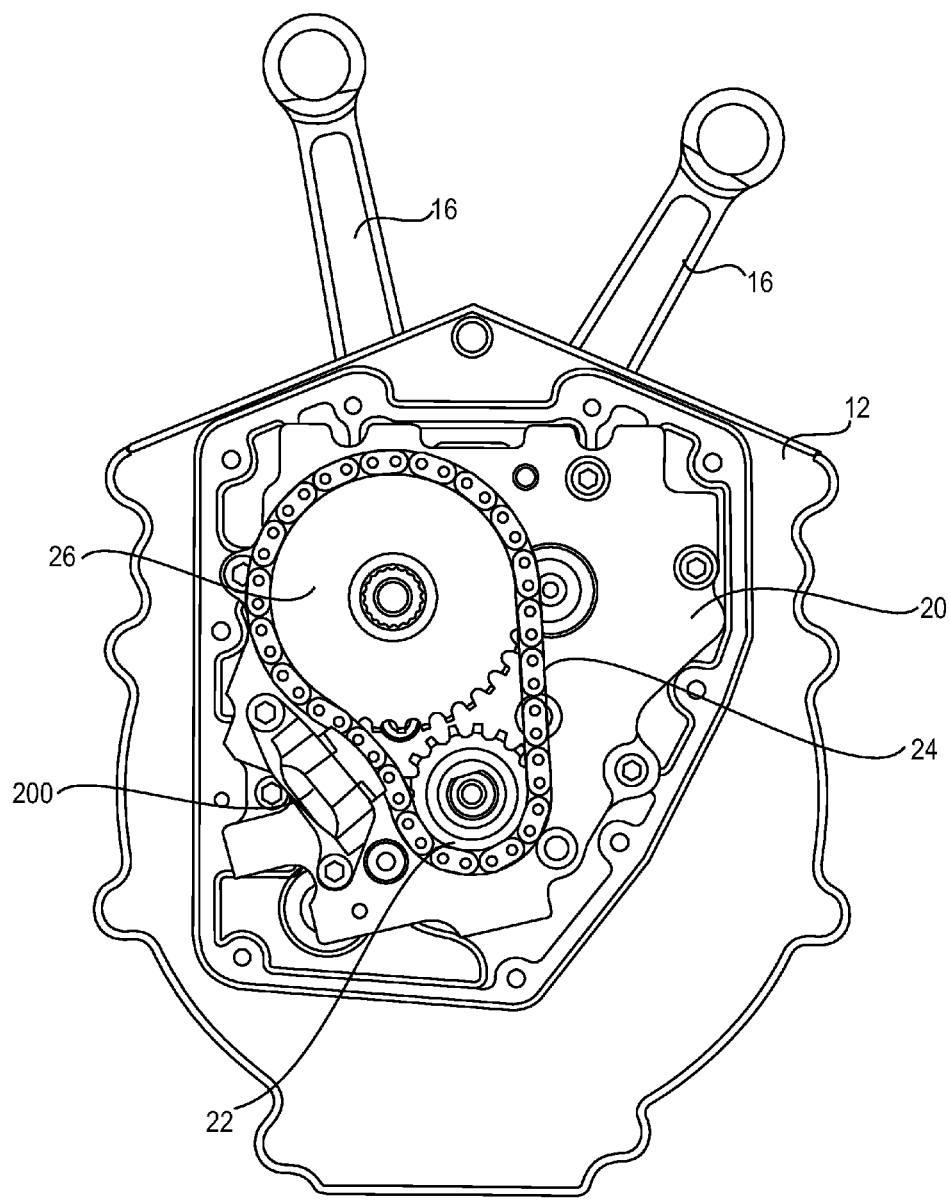
FIG. 5 is a front view of the assembly of FIG. 3.

Some examples of various embodiments will now be described with reference to the drawing figures, in which like reference numerals refer to like parts throughout. FIG. 1 illustrates components of a motorcycle engine 10 including a crankcase 12. The crankcase 12 supports a main crankshaft 14 that is driven by piston rods 16 that are each connected to a respective engine piston. A cam drive output end 18 of the crankshaft 14 extends from the crankcase 12.

A camshaft support plate 20 is mounted to the crankcase 12 such that the cam drive output end 18 drives a sprocket 22. The sprocket 22 is connected by a primary cam drive chain 24 to a sprocket 26. The sprocket 26 is mounted to a first camshaft 28 and rotates the first camshaft 28 when the engine 10 is rotated. A sprocket 30 on the first camshaft 28 drives a secondary cam drive chain 32 that further drives a secondary cam shaft sprocket 34 to rotate a second camshaft 36. The cam drive output end 18 is journaled in the camshaft support plate 20 and extends through it. The first camshaft 28 is journaled in the camshaft support plate 20 and extends through it. The second camshaft 36 is journaled into the camshaft support plate 20.

A first camshaft drive chain tensioner 100 has a body 102 mounted to the inner side of the camshaft shaft support plate 20 and has a shoe 104 in sliding contact with the chain 32. A second camshaft drive chain tensioner 200 is mounted to the camshaft support plate 20 by having a main body 202 mounted to the outer side of the camshaft support plate 20, and includes a biased shoe 204 in sliding contact with the chain 24. FIGS. 2-7 depict the arrangement of FIG. 1 from various angles, showing the camshaft shaft support plate 20 and the related components discussed above.

Figure 8:
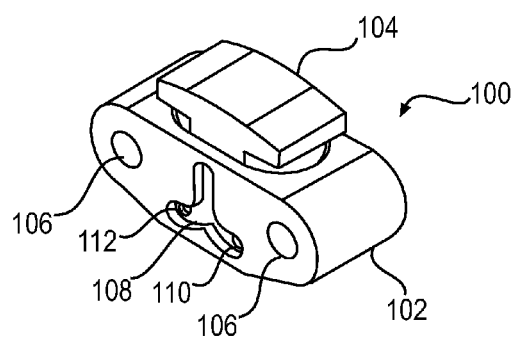
FIG. 8 is a perspective view of a camshaft drive chain tensioner according to the first embodiment.
Figure 9:
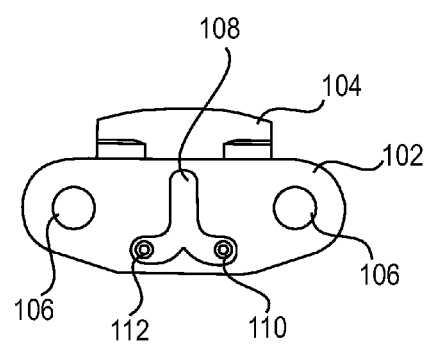
FIG. 9 is a front view of the tensioner of FIG. 8.
Figure 10:
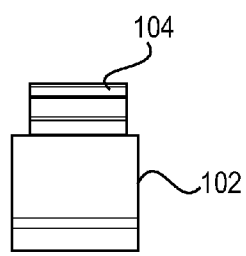
FIG. 10 is a side view of the tensioner of FIG. 8.
Figure 11:
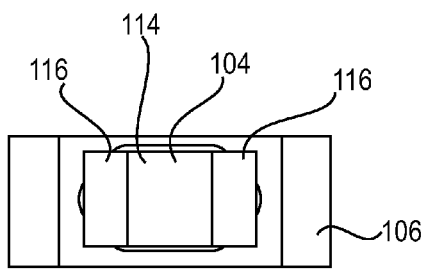
FIG. 11 is a top view of the tensioner of FIG. 8.
Figure 12:
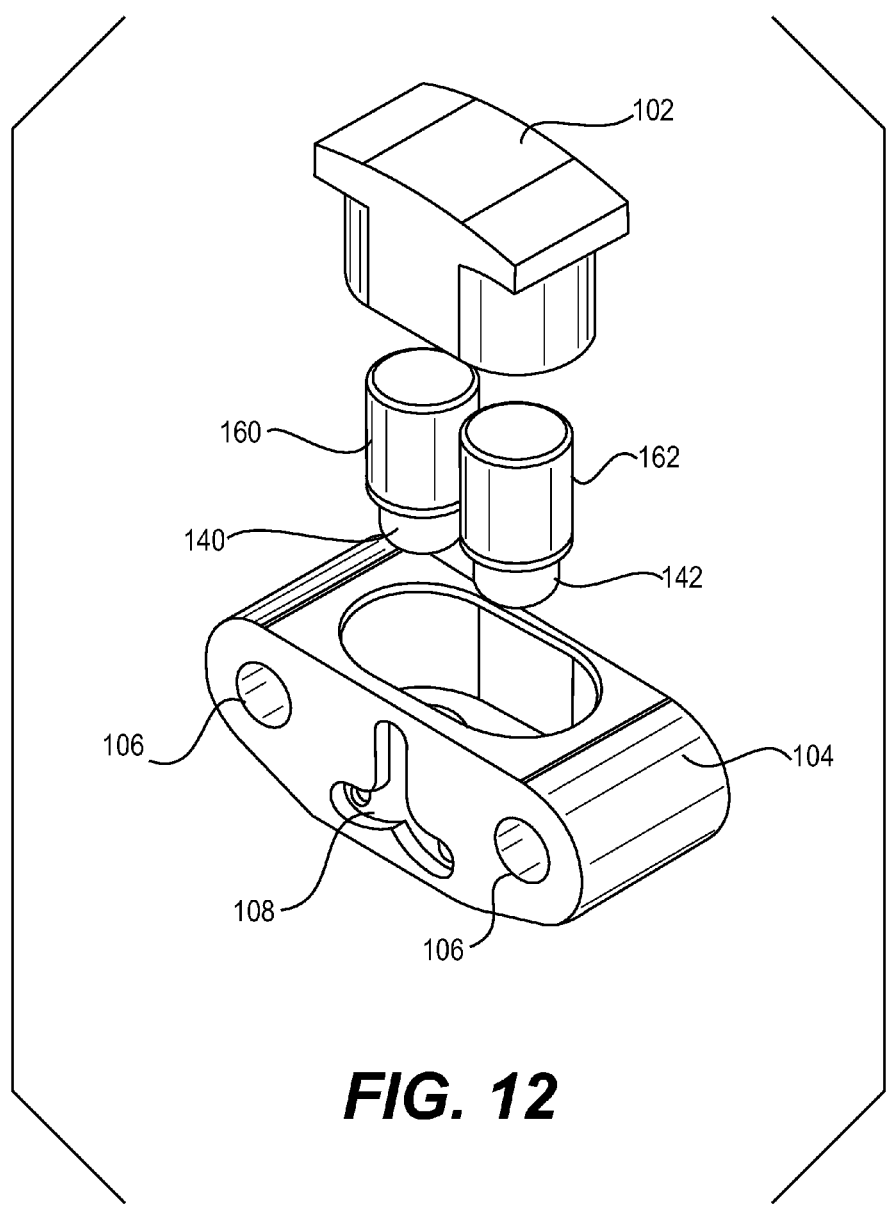
FIG. 12 is a perspective partially exploded view of the tensioner of FIG. 8.
Figure 15:
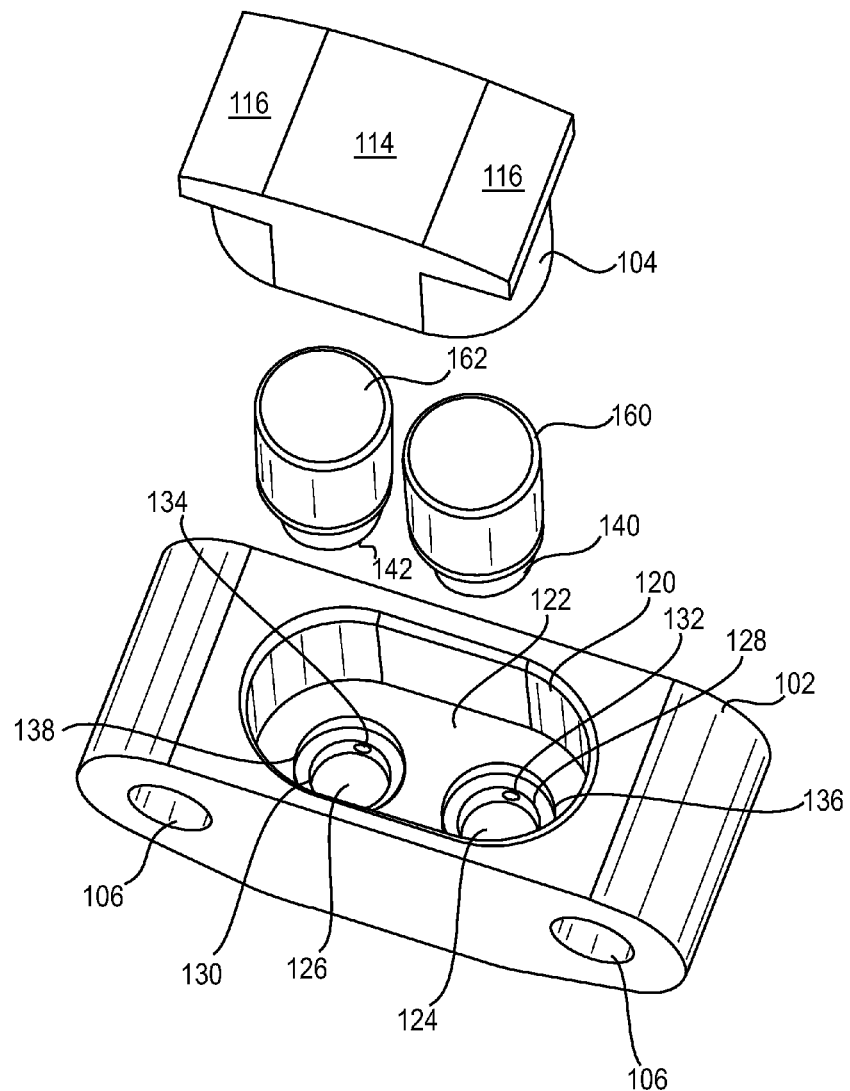
FIG. 15 is a perspective partially exploded view of the tensioner of FIG. 8.
Figure 16:
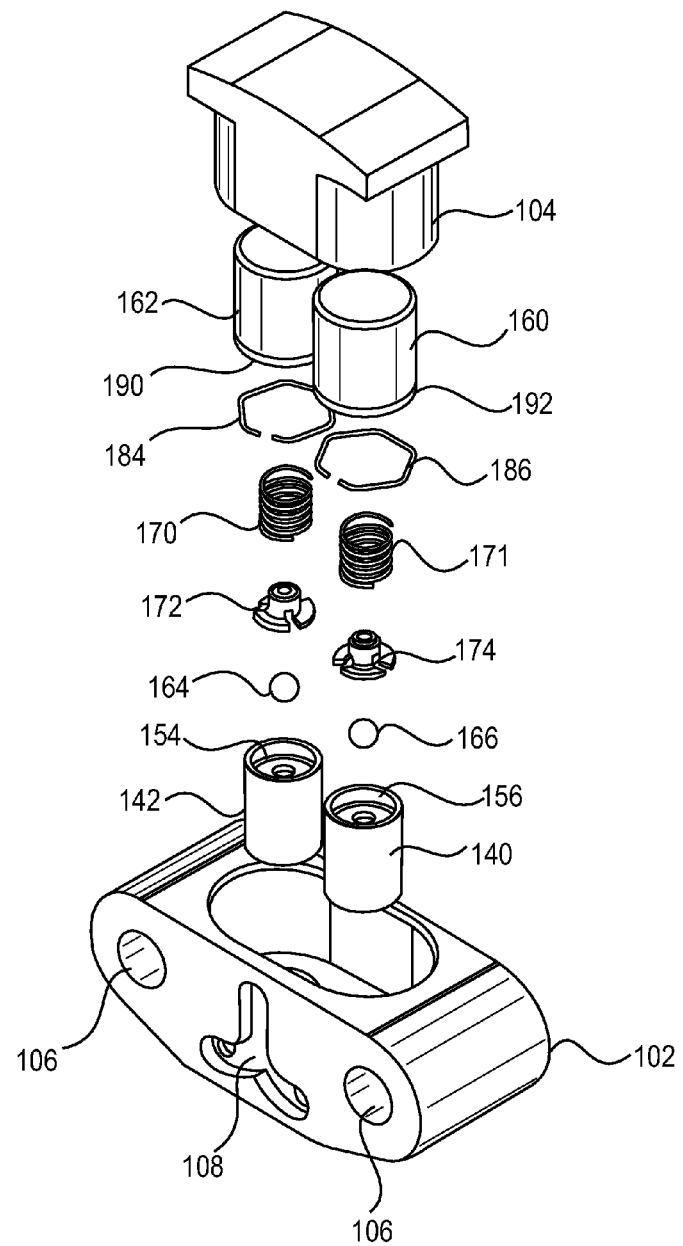
FIG. 16 is a perspective fully exploded view of the tensioner of FIG. 8.
Figure 17:
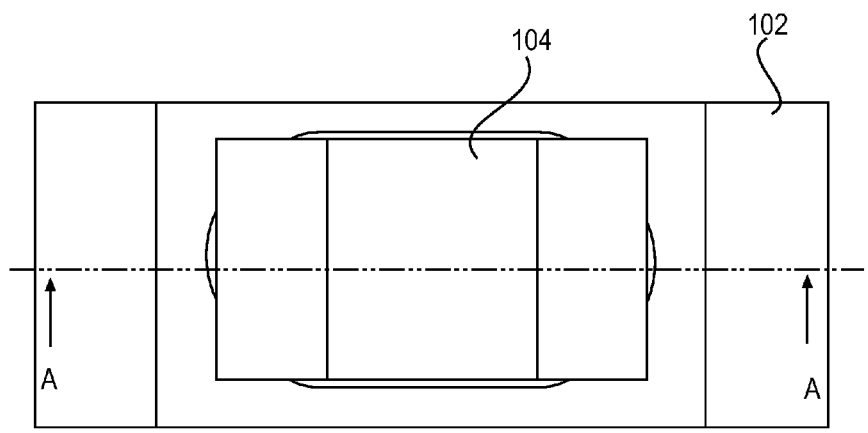
FIG. 17 is a top view of the tensioner of FIG. 8 showing a section line A-A.
Figure 18:
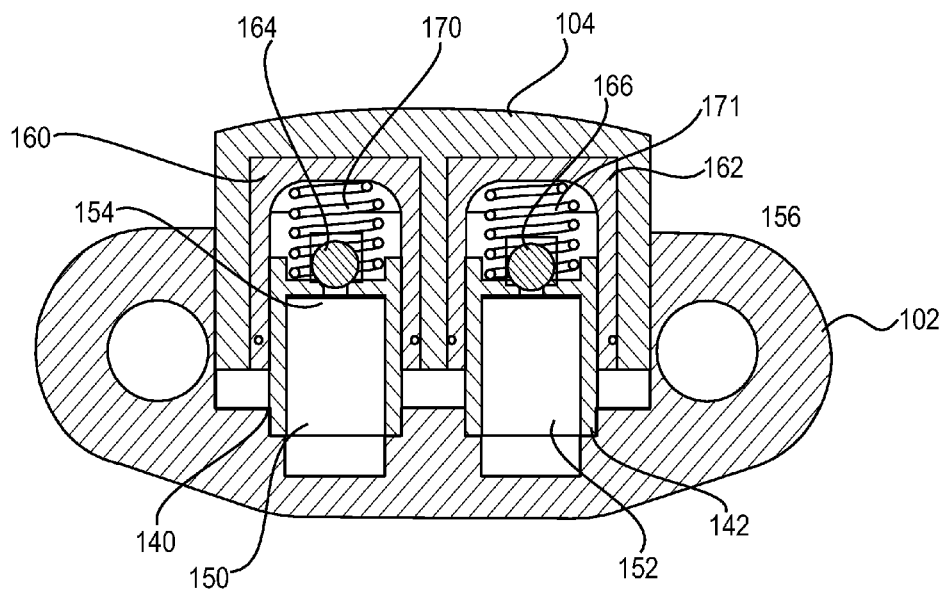
FIG. 18 is a cross sectional view taken through line A-A in FIG. 17.
Figure 22:
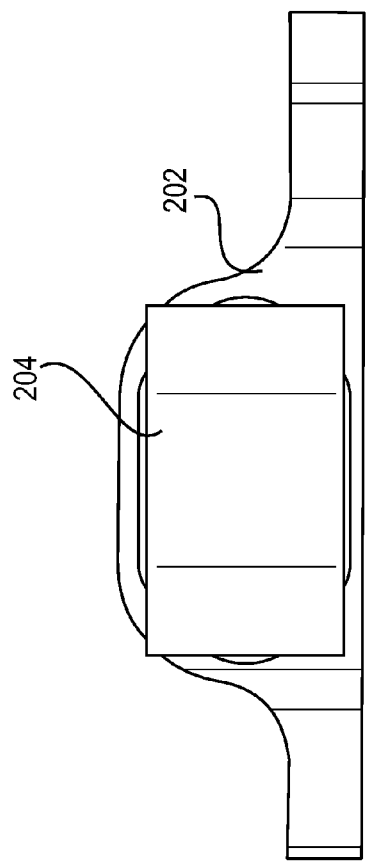
FIG. 22 is a top view of the tensioner of FIG. 19.

Turning to FIGS. 8-18, and 27, a first embodiment of a camshaft drive chain tensioner 100 will now be described in further detail. FIGS. 8-10 illustrate the main body 102 and shoe 104. The main body 102 may be manufactured from any suitable material, for example being machined from a metal such as aluminum. The shoe 104 may also be made of any suitable material, and may, in some instances, be a material that is adapted for slidable frictional contact with a metal chain. Examples of some materials that may be suitable in some instances can include PEEK (polyether ether ketone); other plastics or materials may also be used.

The main body 102 is mounted to the camshaft shaft support plate 20 via a suitable mounting fashion such as, for example, by two mounting holes 106 that receive fasteners that fasten the body 102 to the camshaft shaft support plate 20. An oil pressure inlet port cavity 108 is machined into the side of the main body 102 that abuts against the camshaft shaft support plate 20. This inlet port region 108 thus receives oil from a pressurized outlet port in the adjacent camshaft shaft support plate 20 and diverts that oil pressure into two specific inlets 110 and 112. These inlets 110 and 112 pass further into the main body 102 as is described below.

The top surface of the shoe 104 may be generally curved, generally flat, or have another shape. For example, in the illustrated embodiment 100, the shoe 104 has a relatively flat central surface 114 and two beveled surface regions 116.

Turing to FIGS. 12-15, the main body 102 has formed inside a primary chamber region 120. The primary chamber region 120 has, at its lower floor 122, a pair of receptacles 124 and 126. Each receptacle 124 and 126 has a respective smaller diameter seat 128 and 130. Each respective seat 128 and 130 has a respective port opening 132 and 134 which supplies the oil under pressure from the inlets 110 and 112. Above the smaller diameter seat 128 and 130, each receptacle 124 and 126 has a larger diameter seat 136 and 138.

The tensioner 100 includes a pair of hydraulic pistons 140 and 142, which are parallel to each other but laterally offset to each other in a side-by-side relationship. Each hydraulic piston 140 and 142 has a hollow bottom end forming a chamber 150 and 152. The lower outer diameter of each piston 140 and 142 sits within the inner diameter of the larger diameter seats 136 and 138 respectively. The pistons 140 and 142 have an outer diameter with a suitable clearance relative to the inner diameters of the larger diameter seats 136 and 138 such that the pistons may move up and down relative to the larger diameter seats 136 and 138. The lower ends of the pistons 140 and 142 also sit flat against the shoulder formed between the smaller diameter seats 128 and 130 and the larger diameter seats 136 and 138. Therefore the chambers 150 and 152 are essentially sealed, due to downward pressure on the shoe and the force from internal springs that are discussed below.

It will be appreciated that high pressure fluid that is supplied to the inlet ports 132 and 134 will enter into respective chambers 150 and 152 that are each formed by the inner hollow region of the pistons 140 and 142 and by the smaller diameter seat regions 128 and 130. The fluid pressure in these chambers 150 and 152 would tend to cause the respective pistons 140 and 142 to rise up vertically relative to the body 102; however, above each piston 140 and 142 sits a respective hydraulic cylinder cap 160 and 162. The hydraulic cylinder caps 160 and 162 also have a hollow open bottom, with an inner diameter that slidably fits around the outer diameter of the adjacent piston 140 and 142. Thus, the cylinder caps 160 and 162 can travel vertically with respect to the pistons 140 and 142. The top of the pistons 140 and 142, at the chambers 150 and 152, include a small open port 154 and 156 through which fluid can pass. A check ball 164 and 166 is disposed above the port 154 and is retained and pushed down towards the port 154 by a check ball retaining cap 172 and 174, that is urged downward by a respective spring 170 and 171 that abuts against a check ball retaining cap 172 and 174 on one spring end and the interior of the cylinder caps 160 and 162 on the other spring end.

The shoe 104 has two main receptacle bores 180 and 182 which are sized to snugly receive the cylinder caps 160 and 162. A spring clip 184 and 186 fits in a groove 190 and 192 and retains the cylinder caps 160 and 162 inside of the bores 180 and 182 once they have been inserted into the bores 180 and 182.

The overall operation of this embodiment will now be further described below. It will be appreciated that in the assembled condition shown in FIG. 1, the camshaft drive chain tensioner 100 is rigidly affixed to the camshaft support plate 20. Further, the shoe 104 is in sliding frictional contact with the chain 32. When the engine 10 is operating, hydraulic pressure is provided to the port region 108. In some embodiments, the hydraulic pressure may be coming from oil under pressure that is exiting hydraulic lash adjusters in the engine 10 via a port in the camshaft support plate.

The pressurized oil can serve, in some examples, two functions with respect to the camshaft drive chain tensioner 100. First, the oil provides some lubrication to the moving parts of the chain tensioner 100, such as, for example, the sliding movement between the main body 102, the hydraulic pistons 140 and 142, the hydraulic cylinder caps 160 and 162, and the shoe 104. Further, the hydraulic pressure tends to urge the cylinder caps 160 and 162 upward against the resisting force provided by the shoe 104 being in contact with the chain 32. This upward force provides an upward compressive force on the chain tensioner shoe 104 such that the shoe 104 is pushed against the side of the chain 32 to provide desirable chain tension.

In some embodiments, the force provided can be of a significant amount. For example, the hydraulic pressure supplied at the input port 108 may be on the order of approximately 10 PSI, leading to a force of on the chain of approximately 25 pounds. These measurements are by way of example only with reference to one type of motorcycle engine 10 that could be used, and other pressures or degrees of force can be applicable.

When the engine 10 is not operating and no or very low pressure is supplied, the force from the springs 170 and 172 provides a nominal contact pressure so that the shoe 104 remains in a generally correct position located against the chain 32. The check valve balls 164 and 166 biased against the ports 154 and 156 further resist the shoe 104 from moving away from chain contact even in low or no pressure conditions.

Figure 21:
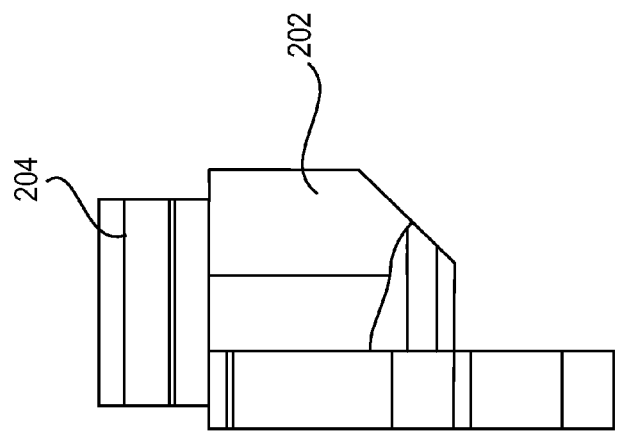
FIG. 21 is a side view of the tensioner of FIG. 19.
Figure 23:
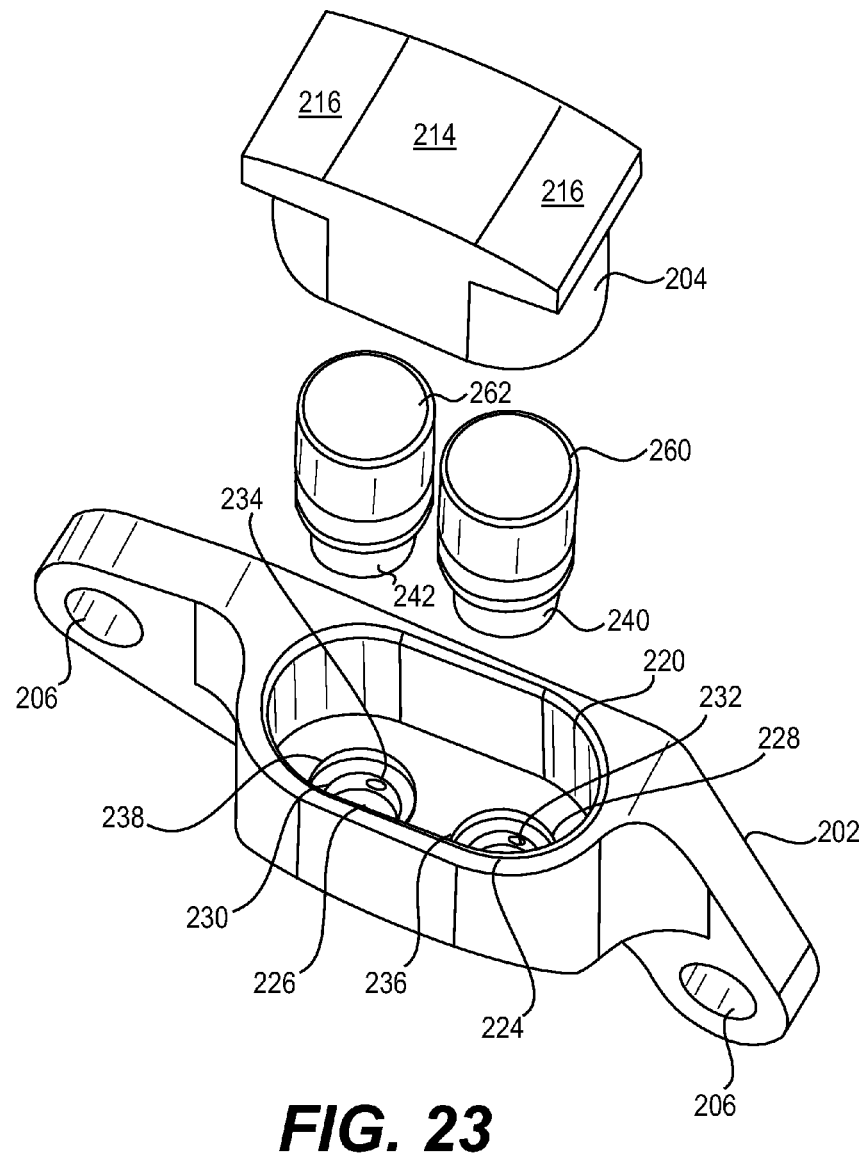
FIG. 23 is a perspective partially exploded view of the tensioner of FIG. 19
Figure 24:
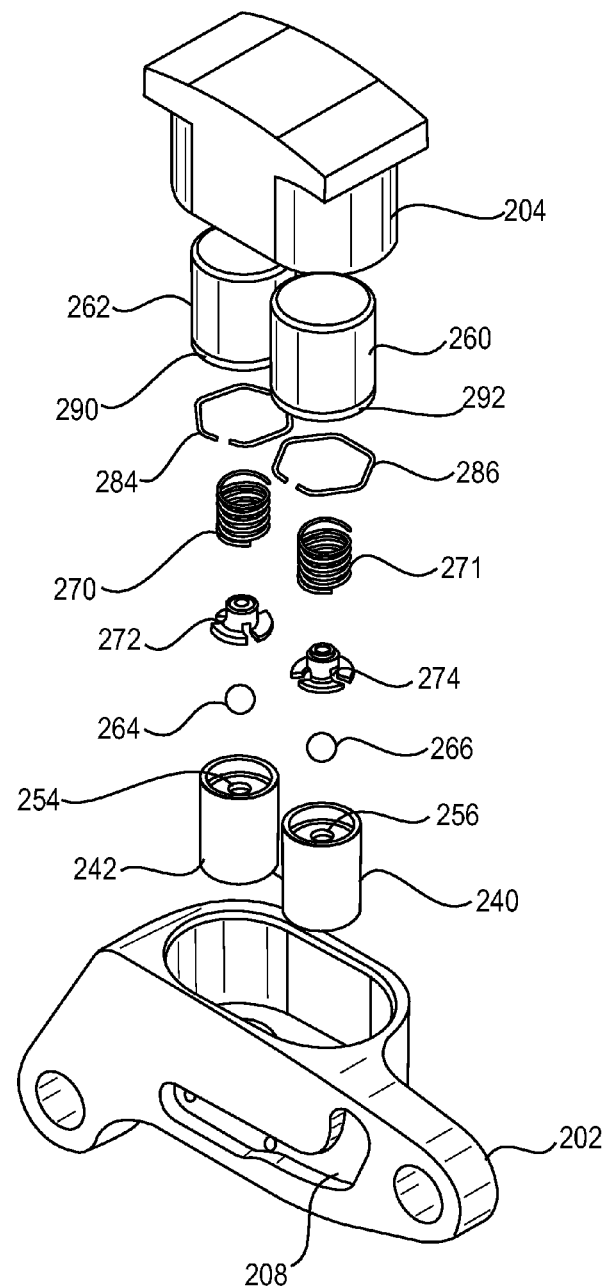
FIG. 24 is a perspective fully exploded view of the tensioner of FIG. 19.
Figure 25:
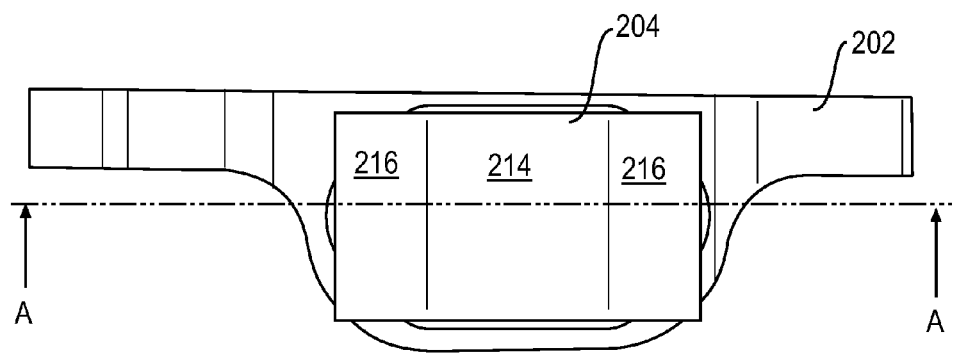
FIG. 25 is a top view of the tensioner of FIG. 19 showing a section line A-A.
Figure 26:
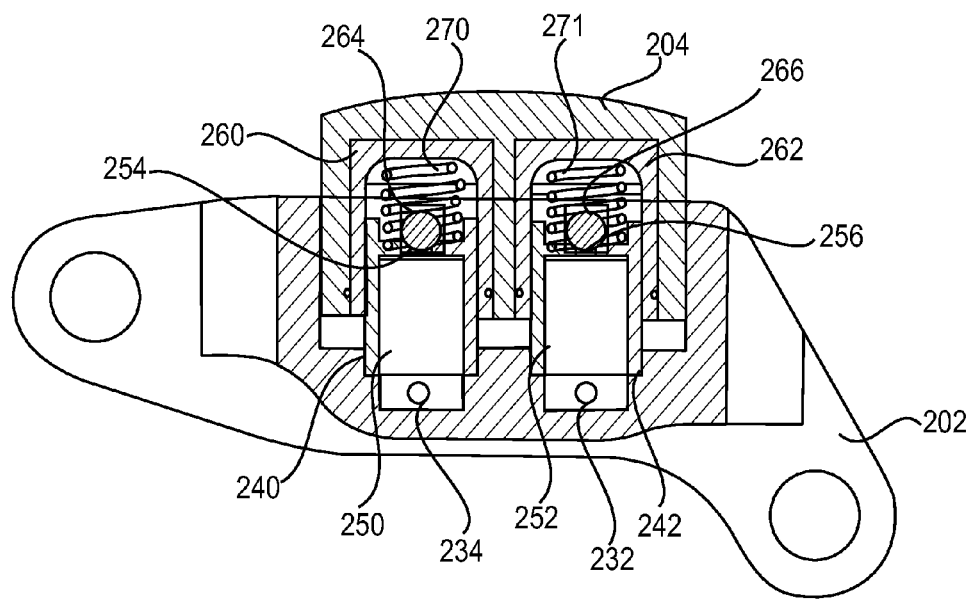
FIG. 26 is a cross sectional view taken through line A-A in FIG. 24.

Turning to FIGS. 19-26, and 28, a second embodiment of a camshaft drive chain tensioner 200 will now be described in further detail. FIGS. 19-21 illustrate the main body 202 and shoe 204. The main body 202 may be manufactured from any suitable material, for example being machined from a metal such as aluminum. The shoe 204 may also be made of any suitable material, and may, in some instances, be a material that is adapted for slidable frictional contact with a metal chain. Examples of some materials that may be suitable in some instances can include PEEK (polyether ether ketone); other plastics or materials may also be used.

The main body 202 is mounted to the camshaft support plate 20 via a suitable mounting fashion such as, for example, by two mounting holes 206 that receive fasteners that fasten the body 202 to the camshaft support plate 20. An oil pressure inlet port cavity 208 is machined into the side of the main body 202 that abuts against the camshaft support plate 20. This inlet port region 208 thus receives oil from a pressurized outlet port in the adjacent camshaft support plate 20 and diverts that oil pressure into two specific inlets 210 and 212. These inlets 210 and 212 pass further into the main body 202, as is described below.

The top surface of the shoe 204 may be generally curved, generally flat, or have another shape. For example, in the illustrated embodiment 200, the shoe 204 has a relatively flat central surface 214 and two beveled surface regions 216.

Turing to FIGS. 23-26, the main body 202 has formed inside a primary chamber region 220. The primary chamber region 220 has, at its lower floor 222, a pair of receptacles 224 and 226. Each receptacle 224 and 226 has a respective smaller diameter seat 228 and 230. Each respective seat 228 and 230 has a respective port opening 232 and 234 which supplies the oil under pressure from the inlets 210 and 212. Above the smaller diameter seat 228 and 230, each receptacle 224 and 226 has a larger diameter seat 236 and 238.

The tensioner 200 includes a pair of hydraulic pistons 240 and 242. Each hydraulic piston 240 and 242 has a hollow bottom end forming a chamber 250 and 252. The lower outer diameter of each piston 240 and 242 sits within the inner diameter of the larger diameter seats 236 and 238 respectively. The pistons 240 and 242 have an outer diameter with a suitable clearance relative to the inner diameters of the larger diameter seats 236 and 238 such that the pistons may move up and down relative to the larger diameter seats 236 and 238. The lower ends of the pistons 240 and 242 also sit flat against the shoulder formed between the smaller diameter seats 228 and 230 and the larger diameter seats 236 and 238. Therefore the chambers 250 and 252 are essentially sealed, due to downward pressure on the shoe 204 and the force from internal springs that are discussed below.

It will be appreciated that high pressure fluid that is supplied to the inlet ports 232 and 234 will enter into respective chambers 250 and 252 that are each formed by the inner hollow region of the pistons 240 and 242 and by the smaller diameter seat regions 228 and 230. The fluid pressure in these chambers 250 and 252 would tend to cause the respective pistons 240 and 242 to rise up vertically relative to the body 202; however each piston has a small open port 254 and 256 discussed below, and above each piston 240 and 242 sits a respective hydraulic cylinder cap 260 and 262. The hydraulic cylinder caps 260 and 262 also have a hollow open bottom, with an inner diameter that slidably fits around the outer diameter of the adjacent piston 240 and 242. Thus, the cylinder caps 260 and 262 can travel vertically with respect to the pistons 240 and 242. The top of the pistons 240 and 242, at the chambers 250 and 252, include a small open port 254 and 256 through which fluid can pass. A check ball 264 and 266 is disposed above the port 254 and is retained and pushed down towards the port 254 by a check ball retaining cap 272 and 274, that is urged downward by a respective spring 270 and 272 that abuts against a check ball retaining cap 272 and 274 on one spring end and the interior of the cylinder caps 260 and 262 on the other spring end.

The shoe 204 has two main receptacle bores 280 and 282 which are sized to snugly receive the cylinder caps 260 and 262. A spring clip 284 and 286 fits in a groove 290 and 292 and retains the cylinder caps 260 and 262 inside of the bores 280 and 282 once they have been inserted into the bores 280 and 282.

The overall operation of this embodiment will now be further described below. It will be appreciated that in the assembled condition shown in FIG. 1, the camshaft drive chain tensioner 200 is rigidly affixed to the camshaft support plate 20. Further, the shoe 204 is in sliding frictional contact with the chain 24. When the engine 10 is operating, hydraulic pressure is provided to the port region 208. In some embodiments, the hydraulic pressure may be coming from oil under pressure that is exiting hydraulic lash adjusters in the engine 10 via a port in the camshaft support plate 20.

The pressurized oil can serve, in some examples, two functions with respect to the camshaft drive chain tensioner 200.

First, the oil provides some lubrication to the moving parts of the chain tensioner 200, such as, for example, the sliding movement between the main body 202, the hydraulic pistons 240 and 242, the hydraulic cylinder caps 260 and 262, and the shoe 204. Further, the hydraulic pressure tends to urge the cylinder caps 260 and 262 upward against the resisting force provided by the shoe 204 being in contact with the chain 24. This upward force provides an upward compressive force on the chain tensioner shoe 204 such that the shoe 204 is pushed against the side of the chain 24 to provide desirable chain tension.

In some embodiments, the force provided can be of a significant amount. For example, the hydraulic pressure supplied at the input port 208 may be on the order of approximately 10 PSI, leading to a force of on the chain of approximately 25 pounds. These measurements are by way of example only with reference to one type of motorcycle engine 10 that could be used, and other pressures or degrees of force can be applicable.

When the engine 10 is not operating and no or very low pressure is supplied, the force from the springs 271 and 272 provides a nominal contact pressure so that the shoe 204 remains in a generally correct position located against the chain 24. The check valve balls 264 and 266 biased against the ports 254 and 256 further resist the shoe 204 from moving away from chain contact even in low or no pressure conditions.

A difference between the first and second illustrated embodiments is that the overall shape of the main bodies 102 and 202 are different. Also these embodiments are mounted on different sides of the camshaft support plate 20 from each other, and they operate to tension different chains 24, 32. In an example where the two embodiments are both used on the engine 10 as in FIG. 1, then it is possible that each tensioner 100 and 200 is supplied a different oil pressure, or is desired to apply a different chain tension force. The dimensions of the interior components, such as the diameters of the pistons and cylinder caps, can be different from one tensioner 100 to the other tensioner 200 to provide the desired chain tension force. Further engines 10 using only one or the other tensioner, on one chain 24 and not on both chains, are possible. Also, in some cases, more than one tensioner may be used on a single chain 24. In addition the tensioner may be used to bias other types of drive bands such as belts. Although the illustrated examples are used with a two cylinder, dual cam, motorcycle engine 10 the tensioners are applicable to engines having more or fewer cylinders, and/or more of fewer camshafts, as well as to engines used in other vehicles or other engine applications.

It will be appreciated that in the first and second illustrated embodiments, a single main body 102 or 202 and a single shoe 104 or 204 are used, with two side-by-side sets of hydraulic pistons 140 and 142 or 240 and 242, and hydraulic cylinder caps 160 and 162 or 260 and 262. This arrangement of two side-by-side pistons and cylinders provides, in some embodiments, a significant advantage. The provision of two pressurized pistons and cylinders greatly resists any side-to-side rocking motion of the moving components relative to the body 102 or 202. Side-to-side rocking motion, depending on the degree, can be undesirable in that it can allow pressure to escape from the system under the seal formed at the bottom of the pistons 140 and 142 or 240 and 242 where they should sit flush on the floor of the main body 102 or 202, leading to leakage around the shoe 104 or 204 and to variations in the applied tensioning force due to the rocking and any associated pressure irregularities due to leakage. However, the provision of two side-by-side pistons 140, 142, 240, 242 greatly reduces any tendency of rocking of the shoe 104, 204 relative to the main body 102, 202. Further, the shoe 104, 204 can be dimensioned with a relatively close tolerance fit into the main body 102, 202 because it will not tend to rock or tilt, due to leakage, relative to its fit in the main body 102, 202.

Figure 29:
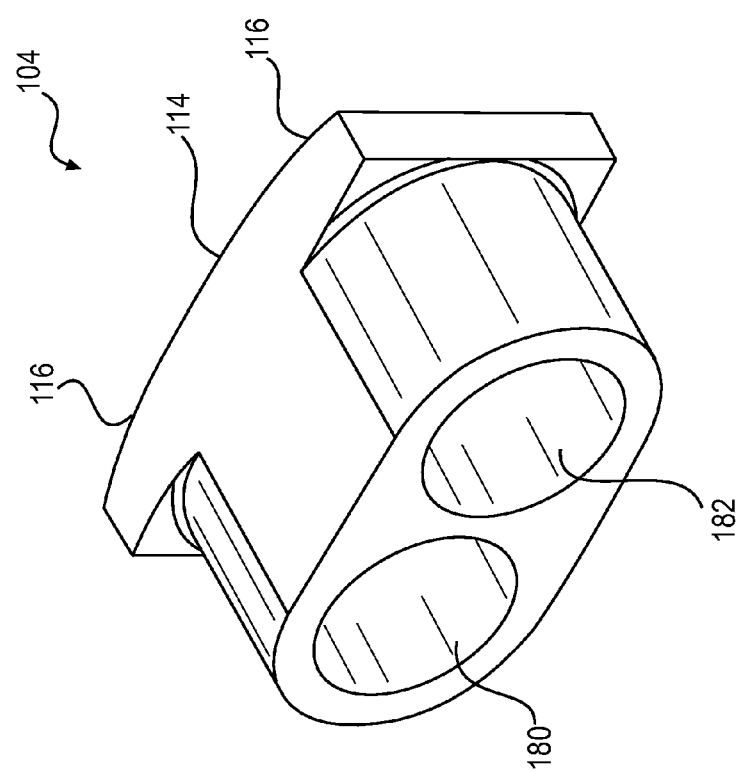
FIG. 29 is a lower perspective view of a shoe.

FIG. 29 is a perspective view of the shoe 104, showing the bores 180 and 182. The shoe 204 and its bores 280 and 282 can have the same or a similar configuration.

Another advantage of using a pair of hydraulic pistons 140, 142, 240, 242 and hydraulic cylinder caps 160, 162, 260, 262 is that temporary pressure fluctuations due to fluid dynamics are also compensated for to some degree. For example, if the oil fluid is subject to variations and pressure some of these may be transmitted to one piston 140, 240 but not to the other 142, 242 to the same degree. Therefore, the use of a pair of pistons 140, 142, 240, 242 as compared to a single piston 140, 240 may at times lead to an overall more smooth application of chain tensioning pressure than will be accomplished by a single piston 140, 240. Further since the two pistons 140, 142, 240, 242 are in mutual fluid communication with each other, they tend to balance each other out when the main pressure supply varies.

The above illustrated embodiments use a piston 140, 240 that remains seated at its lower end to the main body 102, 202 and a cylinder cap 160, 260 that remains seated inside a bore in the shoe 104, 204. The cylinder cap 160, 260 moves relative to the piston 140, 240. However, in other embodiments, there can be two side-by-side fluid chambers each formed solely by a piston 140, 240 that slidably moves along a bore in the main body 102, 202 or each solely formed by a cylinder cap 160, 260 that slidably moves along a bore in the main body 102, 202. Moreover, in other embodiments, there can be two side-by-side fluid chambers each formed solely by a piston 140, 240 that slidably moves along a bore in the shoe 104, 204, or each solely formed by a cylinder cap 160, 260 that slidably moves along a bore in the shoe 104, 204. Any of these arrangements still results in two side-by-side fluid chambers that expand under supplied fluid pressure to bias the shoe 104 or 204 away from the main body 102, 202. Any of the piston 140, 240 or cylinder caps 160, 260 can be integral with or a part of the main body 102, 202 or shoe 104, 204. Thus in some embodiments the embodiment may simply involve a shoe 104, 204 mounted to the main body 102, 202 to form two pressurized chambers side-by-side.

The above advantages of some embodiments in some instances are suitable for many types of engines, including motorcycles engines. Some motorcycle engines are prone to large overall vibrations, as well as variations in degrees of torque that is applied to the main camshaft drive at different rotations. Providing a smooth camshaft tension in such circumstances is desirable. For example, a relatively smooth and even camshaft chain drive tension may assist with the cam timing being closer to the desired earn timing, as well as reducing noise associated with the entire system.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A cam drive tensioner for use with an engine having a cam drive chain, the tensioner comprising:
 a main body having a first fluid inlet port and a second fluid inlet port, with said first and second fluid inlet ports being in fluid communication with each other, and a floor having a first piston mounting surface and a second piston mounting surface, with the first piston mounting surface having a first fluid outlet port in fluid communication with the first fluid inlet port, and the second piston mounting surface having a second fluid outlet port in fluid communication with the second fluid inlet port;
 a first piston having a first top end and a first open bottom end that forms a first fluid chamber in combination with the first piston mounting surface;
 a second piston having a second top end and an second open bottom end that forms a second fluid chamber in combination with the second piston mounting surface; and
 a shoe movable with respect to the main body, with the first and second pistons each disposed in between the shoe and the main body so that fluid pressure applied to the first and second fluid inlet ports urges the shoe away from the main body.

2. The tensioner according to claim 1, wherein the main body is mounted to a camshaft support plate.

3. The tensioner according to claim 1, wherein the engine has at least one cam drive chain, and the two fluid chambers receive pressurized fluid and bias the shoe toward the cam drive chain.

4. The tensioner according to claim 1, wherein each piston has a hollow interior region.

5. The tensioner according to claim 1, wherein each piston has a respective top port, and a cylinder cap is disposed over the top port and in contact with the shoe.

6. The tensioner according to claim 5, further comprising a respective one-way check valve located at each top port.

7. The tensioner according to claim 1, wherein the shoe is movable with respect to the main body in a first direction, the first piston is aligned parallel to the second piston, and the first piston is laterally offset from the second piston in a direction perpendicular to the first direction.

8. The tensioner according to claim 1, wherein the shoe has a first recess and a second recess, and the tensioner further comprises:
 a first cylinder cap disposed in the first recess; and
 a second cylinder cap disposed in the second recess.

9. The tensioner according to claim 8, wherein the first piston has a first outlet port and the second piston has a second outlet port.

10. The tensioner according to claim 9, wherein the first cylinder cap extends partially over the first piston and has a first hollow interior region that receives fluid pressure from the first outlet port, and wherein the second cylinder cap extends partially over the second piston and has a second hollow interior region that receives fluid pressure from the second outlet port.

11. The tensioner according to claim 10, further comprising a first check valve located adjacent the first outlet port and a second cheek valve located adjacent the second outlet port.

12. The tensioner according to claim 10, further comprising a first spring disposed between the first piston and the first cylinder cap and a second spring disposed between the second piston and the second cylinder cap.

* * * * *